(12) United States Patent
Yamashita

(10) Patent No.: US 10,959,084 B2
(45) Date of Patent: Mar. 23, 2021

(54) WIRELESS COMMUNICATION SYSTEM, WIRELESS COMMUNICATION DEVICE, AND WIRELESS COMMUNICATION METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Makoto Yamashita, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/804,627

(22) Filed: Feb. 28, 2020

(65) Prior Publication Data

US 2021/0058765 A1 Feb. 25, 2021

(30) Foreign Application Priority Data

Aug. 23, 2019 (JP) .............................. JP2019-152930

(51) Int. Cl.
| | |
|---|---|
| *H04M 3/00* | (2006.01) |
| *H04W 8/18* | (2009.01) |
| *G01S 3/48* | (2006.01) |
| *H04W 16/28* | (2009.01) |
| *H04M 1/725* | (2021.01) |

(52) U.S. Cl.
CPC ................. *H04W 8/18* (2013.01); *G01S 3/48* (2013.01); *H04W 16/28* (2013.01); *H04M 1/72519* (2013.01); *H04M 1/72522* (2013.01)

(58) Field of Classification Search
CPC ....... H04W 8/18; H04W 88/02; H04W 8/245; G01S 3/48; H04M 1/72519; H04M 1/72522
USPC ..................... 455/418, 550.1, 419
See application file for complete search history.

(56) References Cited

U.S. PATENT DOCUMENTS

| | | | |
|---|---|---|---|
| 7,212,828 | B2 | 5/2007 | Hind et al. |
| 8,086,536 | B2 | 12/2011 | Dublish et al. |
| 8,830,913 | B1 | 9/2014 | Sosa et al. |

(Continued)

FOREIGN PATENT DOCUMENTS

| | | |
|---|---|---|
| JP | H0981516 A | 3/1997 |
| JP | 2005045384 A | 2/2005 |

(Continued)

*Primary Examiner* — Danh C Le
(74) *Attorney, Agent, or Firm* — Holtz, Holtz & Volek PC

(57) ABSTRACT

A wireless communication system according to an embodiment comprises a first wireless communication device and a second wireless communication device. The first wireless communication device is configured to transmit a signal related to program. The second wireless communication device is configured to compute an angle of departure from the first wireless communication device based on a radio wave transmitted from the first wireless communication device, and to perform updating of the program when a computed angle of departure is a predetermined angle.

6 Claims, 5 Drawing Sheets

(56) References Cited

U.S. PATENT DOCUMENTS

| | | | | |
|---|---|---|---|---|
| 2012/0263226 A1* | 10/2012 | Inohiza | ................. | H04N 19/37 |
| | | | | 375/240.02 |
| 2015/0029056 A1* | 1/2015 | Yanagidate | .......... | H01Q 25/002 |
| | | | | 342/367 |
| 2017/0351262 A1* | 12/2017 | Suzuki | ................. | G05D 1/0257 |
| 2018/0070205 A1* | 3/2018 | Berger | ..................... | G01S 3/46 |
| 2019/0191442 A1* | 6/2019 | Lu | ....................... | H04W 74/006 |
| 2019/0305416 A1* | 10/2019 | Ahmed | ............... | H04B 7/0617 |
| 2019/0353749 A1* | 11/2019 | Lam | .......................... | G01S 5/16 |
| 2020/0150216 A1* | 5/2020 | Shpak | ...................... | G01S 5/10 |
| 2020/0200853 A1* | 6/2020 | Horimoto | ............. | H01Q 25/02 |
| 2020/0219371 A1* | 7/2020 | Mizuno | ............. | G08B 13/2462 |

FOREIGN PATENT DOCUMENTS

| | | | |
|---|---|---|---|
| JP | 2006085718 A | | 3/2006 |
| JP | 2006512814 A | | 4/2006 |
| JP | 2017504232 A | | 2/2017 |

\* cited by examiner

WIRELESS COMMUNICATION SYSTEM, WIRELESS COMMUNICATION DEVICE, AND WIRELESS COMMUNICATION METHOD

CROSS-REFERENCE TO RELATED APPLICATIONS

This application is based upon and claims the benefit of priority from Japanese Patent Application No. 2019-152930, filed on Aug. 23, 2019; the entire contents of which are incorporated herein by reference.

FIELD

Embodiments of the present invention relate to a wireless communication system, a wireless communication device, and a wireless communication method.

BACKGROUND

In recent years, electronic devices capable of rewriting firmware within devices by using a wireless communication method referred to as "OTA (Over The Air)" have been widespread. However, when the firmware is updated, there is a risk that unintended firmware is written in the devices by a third party intentionally or by a user himself mistakenly.

DETAILED DESCRIPTION

A wireless communication system according to an embodiment comprises a first wireless communication device and a second wireless communication device. The first wireless communication device is configured to transmit a signal related to program. The second wireless communication device is configured to compute an angle of departure from the first wireless communication device based on a radio wave transmitted from the first wireless communication device, and to perform updating of the program when a computed angle of departure is a predetermined angle.

Embodiment

Figure 1:
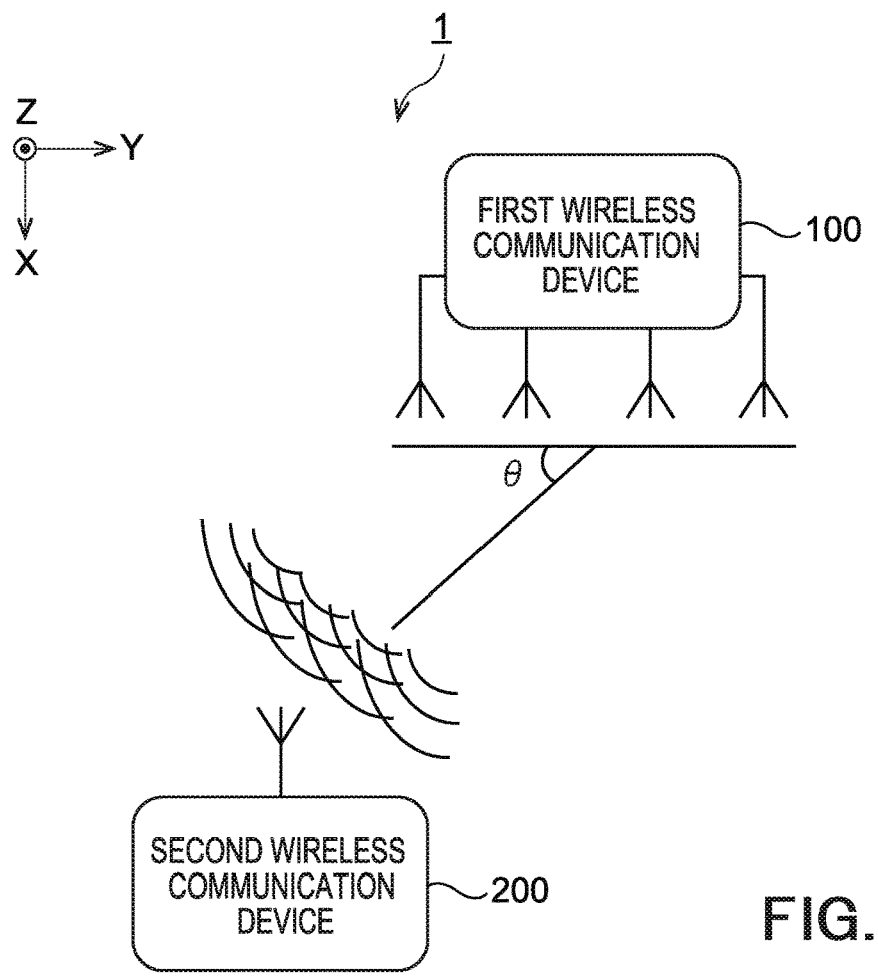
FIG. 1 is a block diagram illustrating a schematic configuration of a wireless communication system according to an embodiment.

FIG. 1 is a block diagram illustrating a configuration of a wireless communication system 1. The wireless communication system 1 includes a first wireless communication device 100 and a second wireless communication device 200. The wireless communication system 1 is a system that can perform updating of firmware in the second wireless communication device 200 by using wireless communication from the first wireless communication device 100 to the second wireless communication device 200. The vertical direction on the drawing of FIG. 1 is defined as a Z direction, and directions that are vertical to the Z direction and are mutually vertical to each other are defined respectively as an X direction and a Y direction.

The first wireless communication device 100 includes four antennas, for example, and transmits a radio wave of 2.4 gigahertz band while switching these antennas. The first wireless communication device 100 transmits a signal including information required for updating (rewriting (including new writing), version upgrading, and the like) of firmware and for computing an angle of departure. More detailed configurations of the first wireless communication device 100 are described later. In the present embodiment, the update target is firmware, but is not limited to this. For example, the update target can be software.

For example, the second wireless communication device 200 measures a phase of each radio wave transmitted from four antennas of the first wireless communication device 100 and computes an angle of departure (AoD) θ based on the phase difference. As illustrated in FIG. 1, the angle of departure θ is a representation of a positional direction of an antenna of the second wireless communication device 200 with respect to two specific antennas of the first wireless communication device 100 as an angle. When the angle of departure θ is a predetermined angle, based on received firmware, the second wireless communication device 200 performs updating of the firmware. More detailed configurations of the second wireless communication device 200 are described later. In the present embodiment, at least one of newly holding or storing firmware and rewriting (including version upgrading) existing firmware into new one is referred to as "updating".

Figure 2:
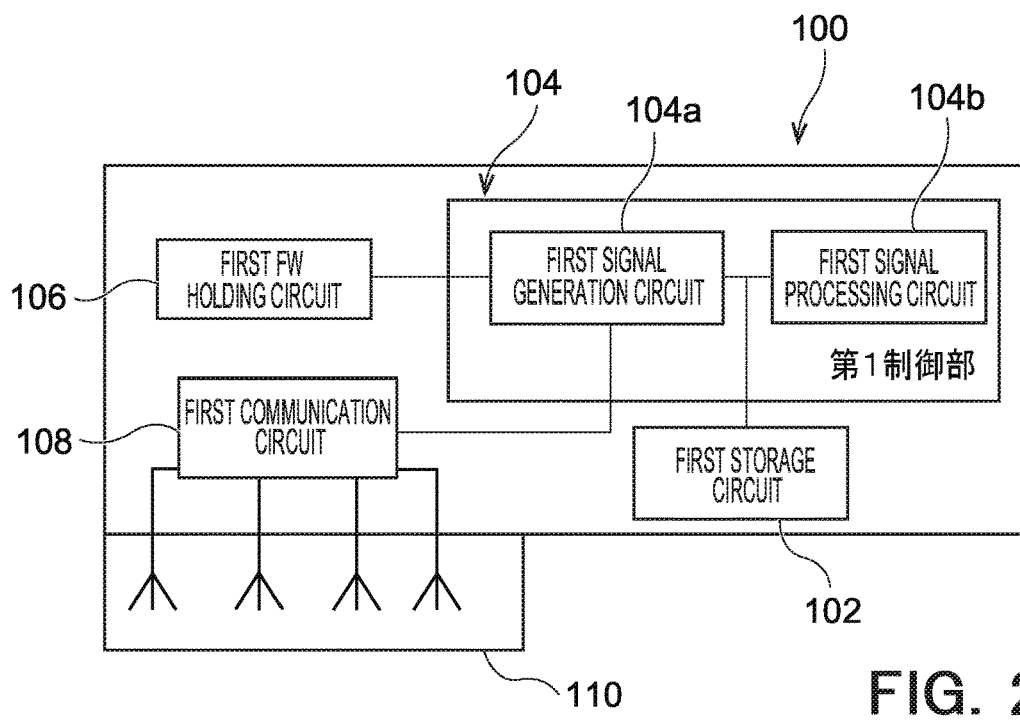
FIG. 2 is a block diagram illustrating a detailed configuration of a first wireless communication device according to the embodiment.

FIG. 2 is a block diagram illustrating a detailed configuration of the first wireless communication device 100. The first wireless communication device 100 is an electronic device on a side of transmitting firmware to be updated, and includes a first storage circuit 102, a first control circuit 104, a first firmware (FW) holding circuit 106, a first communication circuit 108, and a first antenna circuit 110.

The first storage circuit 102 is constituted by a memory such as a ROM (Read Only Memory) or a RAM (Random Access Memory). The first storage circuit 102 stores therein various types of information such as a communication parameter for wireless communication. Further, the first storage circuit 102 stores therein firmware for controlling the first control circuit 104 and programs.

The first control circuit 104 is configured to include a processor such as a CPU (Central Processing Unit) or an MPU (Micro Processing Unit), and includes a first signal generation circuit 104a and a first signal processing circuit 104b. The first control circuit 104 controls the overall first wireless communication device 100 by executing the firmware and programs stored in the first storage circuit 102.

The first signal generation circuit 104a generates a trigger signal as a system signal and transmits the trigger signal via the first communication circuit 108. Further, the first signal generation circuit 104a generates information required for computing an angle of departure based on the information stored in the first storage circuit 102 and transmits the generated information via the first communication circuit 108. Examples of the information required for computing an angle of departure include information such as an antenna number, a positional relation information such as an interval between antennas, an antenna direction, an antenna tilt angle, a wavelength of a transmitted radio wave are included. Furthermore, the first signal generation circuit 104a generates a measurement signal for each antenna as a signal for measuring an angle of departure. This measurement signal is a carrier wave, for example. The carrier wave is, for example, a 2.4 gigahertz band and in a bandwidth of 80 megahertz.

When the first signal generation circuit 104a performs transmission compliant with the Bluetooth (registered trademark) specification, particularly with the Bluetooth 5.1 specification, it is possible to configure that the first signal generation circuit 104a uses IQ (In-Phase and Quadrature) sampling to measure the phase of a radio wave to be transmitted from each antenna, thereby generating an azimuth estimation packet referred to as "CTE (Constant Tone Extension)" that includes the measured value.

The Bluetooth 5.1 specification is a wireless communication system having a direction finding function.

The first signal processing circuit 104b performs processing with regard to transmission and reception of signals via the first communication circuit 108. For example, when a signal received from the second wireless communication device 200 includes information of a firmware transmission permission, the first signal processing circuit 104b transmits information of firmware in the first firmware holding circuit 106 via the first communication circuit 108 to the second wireless communication device 200. The second wireless communication device 200 performs, for example, updating of firmware according to received information from the first wireless communication device 100.

The first firmware holding circuit 106 is constituted by a memory such as a flash ROM (Read Only Memory) or a RAM (Random Access Memory). The first firmware holding circuit 106 stores therein various types of firmware and required information for updating the firmware in the second wireless communication device 200. The first firmware holding circuit 106 may also use a storage medium such as a flexible disk, a hard disk, an optical disk, a magneto optical disk, a CD-ROM, a CD-R, a magnetic tape, a nonvolatile memory card, or a DVD.

The first communication circuit 108 controls wireless communication as a wireless communication interface with respect to the second wireless communication device 200. For example, the first communication circuit 108 can perform communication compliant with the Bluetooth specification, particularly with the Bluetooth 5.1 specification. The first communication circuit 108 controls the first antenna circuit 110 to perform transmission and reception of radio signals for wireless communication.

The first antenna circuit 110 is constituted by a plurality of antennas. While the first antenna circuit 110 according to the present embodiment includes four antennas, the number thereof is not limited four.

Figure 3:
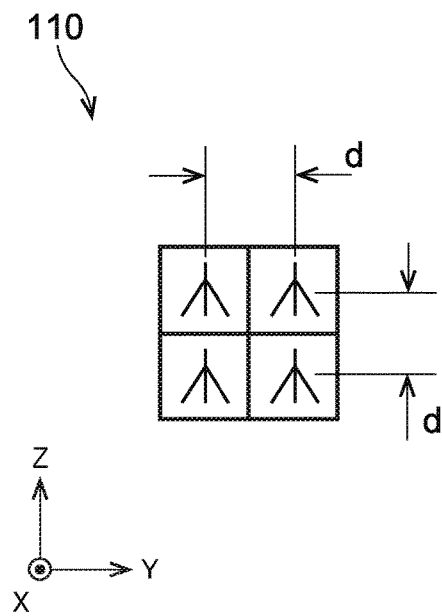
FIG. 3 is a diagram illustrating a configuration example of an antenna circuit of the first wireless communication device according to the embodiment.

FIG. 3 is a diagram illustrating a configuration example of the first antenna circuit 110. Two specific antennas of the first antenna circuit 110 being arranged on a YZ plane and adjacent to each other in the Y direction or the Z direction are arranged with an interval of a distance d=λ/4, for example. λ is a wavelength of a carrier wave transmitted from the first antenna circuit 110. When the carrier wave is 2.4 megahertz, λ is about 12 centimeters, and thus d is about 3 centimeters. These four antennas are circular polarized directional antennas. That is, when the angle of departure θ is within a range of 0 to 180 degrees, the phase difference between carrier waves transmitted from the two specific antennas changes within a range of $-\pi/2$ to $\pi/2$ or $\pi/2$ to $-\pi/2$ depending on the antenna serving as a reference.

Figure 4:
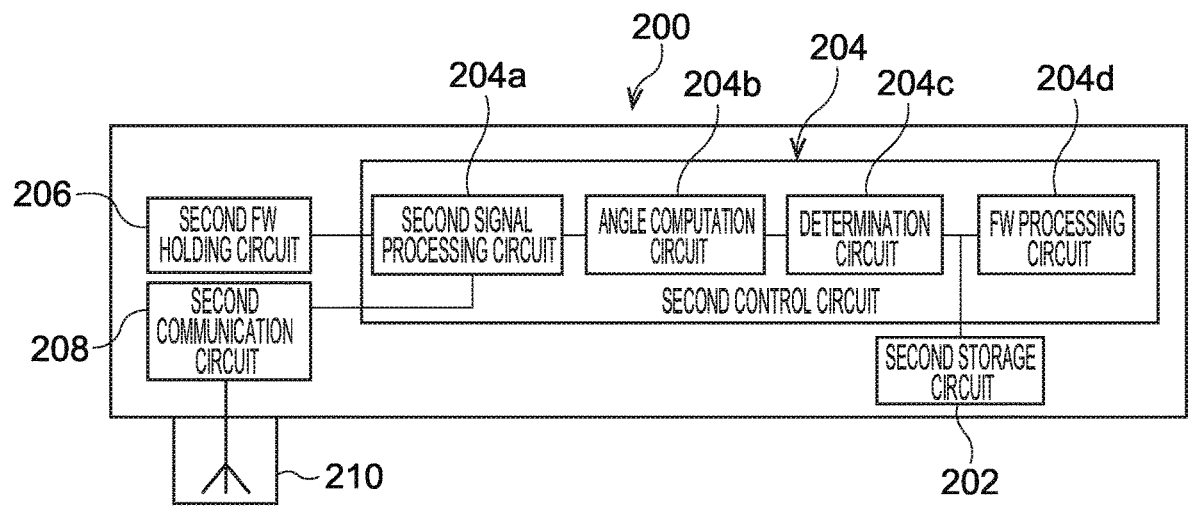
FIG. 4 is a block diagram illustrating a detailed configuration of a second wireless communication device according to the embodiment.

FIG. 4 is a block diagram illustrating a detailed configuration of the second wireless communication device 200. The second wireless communication device 200 is an electronic device on a side where firmware is updated, and includes a second storage circuit 202, a second control circuit 204, a second firmware holding circuit 206, a second communication circuit 208, and a second antenna circuit 210. The second wireless communication device 200 is, for example, a smartphone, a tablet computer, a personal computer, a printer, a digital camera, a portable telephone, or a game machine.

The second storage circuit 202 is constituted by a memory such as a ROM, a RAM, or a flash memory. The second storage circuit 202 stores therein firmware and programs of the second control circuit 204. The firmware is stored in the second storage circuit 202 in a rewritable manner into a flash memory, for example.

The second control circuit 204 is configured to include a processor such as a CPU or an MPU, and includes a second signal processing circuit 204a, an angle computation circuit 204b, a determination circuit 204c, and a firmware (FW) processing circuit 204d. The second control circuit 204 controls the overall second wireless communication device 200 by executing the firmware and programs stored in the second storage circuit 202. Details of the second control circuit 204 are described later.

The second firmware (FW) holding circuit 206 is constituted by a memory such as a ROM and a RAM. The second firmware holding circuit 206 holds firmware. For example, when an angle of departure computed by the angle computation circuit 204b is determined to be a predetermined angle based on determination made by the determination circuit 204c described later, the second firmware holding circuit 206 holds firmware having been transmitted from the first wireless communication device 100.

The second communication circuit 208 controls wireless communication as a wireless communication interface. For example, the second communication circuit 208 can also perform communication compliant with the Bluetooth specification, particularly with the Bluetooth 5.1 specification. The second communication circuit 208 controls the second antenna circuit 210 to perform transmission and reception of radio signals for wireless communication.

The second antenna circuit 210 is constituted by one antenna, for example. While the second antenna circuit 210 according to the present embodiment includes one antenna, the number thereof is not limited to one.

Details of the second control circuit 204 are described here.

The second signal processing circuit 204a processes a signal received via the second antenna circuit 210, and determines whether intended information is included in the signal. For example, the second signal processing circuit 204a processes a received signal and determines whether a trigger signal for updating firmware has been received from the first wireless communication device 100. When it is determined that a trigger signal has been received, the second signal processing circuit 204a instructs the angle computation circuit 204b to start computation of the angle of departure θ. Further, the second signal processing circuit 204a processes the received signal to determine whether firmware is included in the received signal. When it is determined that firmware has been received, the second signal processing circuit 204a causes the second firmware holding circuit 206 to start holding of the firmware.

Figure 5:
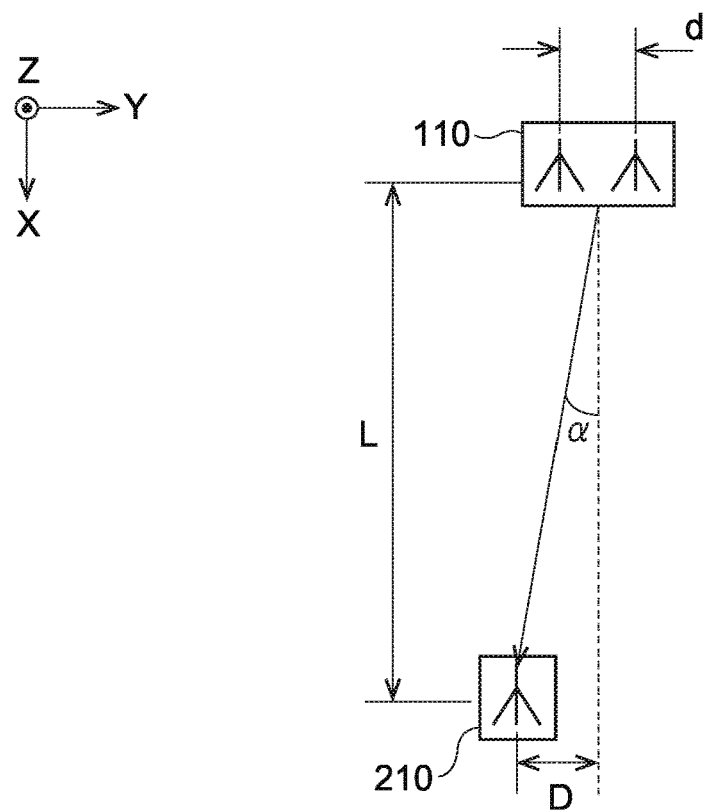
FIG. 5 is a diagram illustrating an arrangement example of two specific antennas and a receiving antenna.

FIG. 5 is a diagram illustrating an arrangement example of two specific antennas of the first antenna circuit 110 that are arranged in a horizontal direction and an antenna of the second antenna circuit 210. An example of a computing process of the angle computation circuit 204b is described with reference to FIG. 5. Here, there is described a case where two specific antennas of the first antenna circuit 110 are arranged to be apart from each other by the difference d=λ/4 in the Y direction as illustrated in FIG. 3.

The angle computation circuit 204b computes an angle of departure based on a phase difference among radio waves that are transmitted from a plurality of antennas of the first antenna circuit 110. More specifically, the angle computation circuit 204b computes Expression (1) assuming that an angle of two antennas apart from each other by L meters is a. As described above, the radio waves are carrier waves.

[Expression 1]

$$\alpha = \arctan(D/L) = \arcsin(\Delta L/d) = \arcsin(2\Delta P/\pi) \quad (1)$$

As represented in Expression (2), ΔL is a difference of a propagation channel length between two specific antennas of the first antenna circuit 110 and a signal antenna of the second antenna circuit 210. ΔP is a phase difference of carrier waves between the two specific antennas. Since d=λ/4 is established, ΔL/d=2ΔP/π is established. Subsequently, according to Expression (3), the angle computation circuit 204b converts the angle α having been computed with the circular measure into the angle of departure θ of the degree measure. In this manner, it is possible to compute the angle of departure θ according to the phase difference of the carrier waves between two antennas that are apart from each other by a wavelength of d=λ/4. It is also possible to perform other processes such as a reducing process of a phase error by combining phase differences of two specific antennas among four antennas.

[Expression 2]

$$\Delta L = \Delta P/(2\pi/\lambda) \quad (2)$$

[Expression 3]

$$\text{Angle of departure } \theta = 90 - 180 \times \alpha/\pi \quad (3)$$

The angle computation circuit 204b can perform angle-of-departure computation compliant with the Bluetooth specification, particularly with the Bluetooth 5.1 specification. In this case, the angle computation circuit 204b can perform calculation by receiving a packet including CTE having been transmitted from the first wireless communication device 100.

The determination circuit 204c determines whether the first wireless communication device 100 is a device that performs updating of intended firmware. More specifically, when the angle of departure θ computed by the angle computation circuit 204b is a predetermined angle β set in advance, the first wireless communication device 100 is determined to be a device that performs updating of intended firmware. The device that performs updating of intended firmware may include a device that performs updating of legitimate firmware. On the other hand, when the angle of departure θ computed by the angle computation circuit 204b is not the predetermined angle β set in advance, the first wireless communication device 100 is determined to be a device that performs updating of unintended firmware. The determination circuit 204c may determine whether the angle of departure θ is within β degrees ±γ degrees. For example, β is 90 degrees and γ is 2 degrees. In this manner, the determination may have a redundancy of ±γ degrees. The device that performs updating of unintended firmware may include a device that performs updating of firmware illegally.

When the determination circuit 204c determines that the first wireless communication device 100 is a device that performs updating of intended firmware, the determination circuit 204c transmits a firmware-transmission permission signal including information of a firmware transmission permission to the first wireless communication device 100. That is, the firmware-transmission permission signal is a signal that is transmitted when the angle of departure θ having been computed based on a measurement signal transmitted from the first antenna circuit 110 is a predetermined angle.

Further, the determination circuit 204c may perform the determination for plural times. For example, the determination circuit 204c may cause the angle computation circuit 204b to perform angle-of-departure computation once again based on a carrier wave at the time of ending reception of firmware so as to perform redetermination. With this process, it is possible to prevent the firmware from being updated when both the first wireless communication device 100 and the second wireless communication device 200 are arranged in a predetermined angle accidentally. For example, it is possible to prevent the firmware from being updated illegally when the first wireless communication device 100 is arranged in a predetermined angle momentarily for illegal purposes.

When firmware is stored in the second firmware holding circuit 206, the firmware processing circuit 204d updates the firmware in the second storage circuit 202 to be the firmware held in the second firmware holding circuit 206. In this case, it is also possible that the firmware processing circuit 204d waits for redetermination performed by the determination circuit 204c before updating the firmware.

The configuration of the wireless communication system 1 is as described above. Processing examples of the wireless communication system 1 are described with reference to FIGS. 6 to 8.

Figure 6:
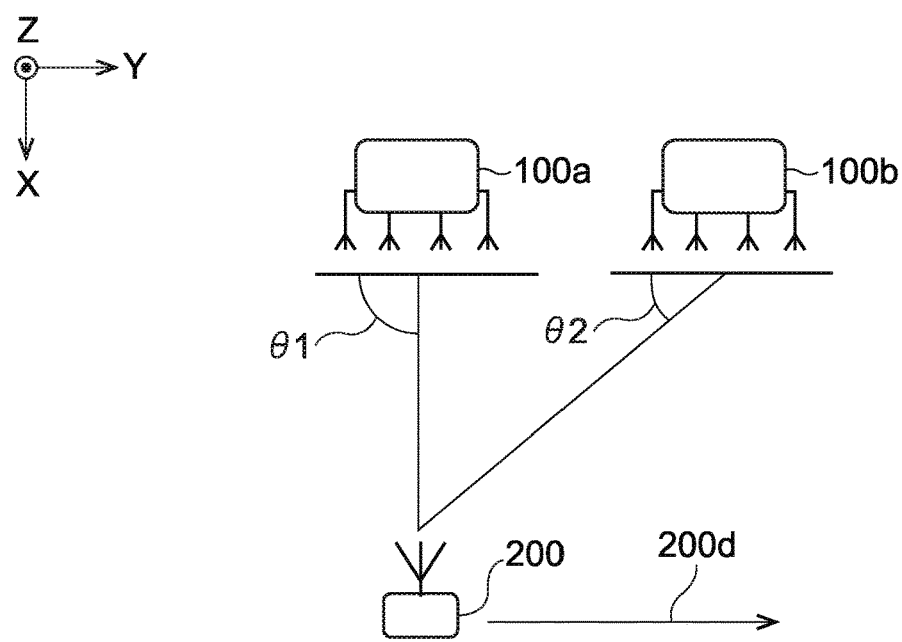
FIG. 6 is an explanatory diagram of an example of a determining process performed by a determination circuit of the second wireless communication device according to the embodiment.

FIG. 6 is a diagram illustrating an example of a determining process performed by the determination circuit 204c. FIG. 6 is an example of a case in which two first wireless communication devices 100a and 100b on a side of updating firmware and one second wireless communication device 200 on a side where firmware is updated are provided. In this case, the set angle of departure θ is within 90 degrees±2 degrees.

The first wireless communication device 100a is a device that is attempting updating of intended firmware. Meanwhile, the first wireless communication device 100b is a device that is attempting updating of another firmware. For example, the second wireless communication device 200 is an electronic device that is conveyed on a conveyor line in a factory. The second wireless communication device 200 sequentially receives plural pieces of firmware from the first wireless communication device 100a and the first wireless communication device 100b, and attempts updating in the order of reception.

An angle of departure θ1 computed by the angle computation circuit 204b based on a carrier wave transmitted from the first wireless communication device 100a is 90 degrees. Meanwhile, an angle of departure θ2 computed by the angle computation circuit 204b based on a carrier wave transmitted from the first wireless communication device 100b is 40 degrees.

Since the angle of departure θ1 is 90 degrees and it is within 90 degrees±2 degrees, the determination circuit 204c determines that the first wireless communication device 100a is an intended device. With this determination, the determination circuit 204c transmits a transmission permission signal of firmware to the first wireless communication device 100a. Subsequently, the second firmware holding circuit 206 holds the firmware having been transmitted from the first wireless communication device 100a. Meanwhile, since the angle of departure θ2 is 40 degrees and it is not within 90 degrees ±2 degrees, the determination circuit 204c determines that the first wireless communication device 100b is an unintended device. The determination circuit 204c does not transmit a transmission permission signal of firmware to the first wireless communication device 100b. Further, even when firmware is transmitted from the first wireless communication device 100b, the determination circuit 204c does not accept the firmware to be held in the second firmware holding circuit 206.

When the second wireless communication device 200 moves on a conveyor line to the direction of an arrow 200d and the angle of departure θ2 is within 90 degrees±2 degrees, since the angle of departure θ2 is within 90 degrees ±2 degrees, the determination circuit 204c determines that the first wireless communication device 100b is an intended device. Accordingly, the determination circuit 204c transmits a transmission permission signal of firmware to the first wireless communication device 100b. Subsequently, the second firmware holding circuit 206 holds the firmware having been transmitted from the first wireless communication device 100b. Meanwhile, since the angle of departure θ1 is not within 90 degrees ±2 degrees, the determination circuit 204c determines that the first wireless communication device 100a is an unintended device. The determination circuit 204c does not transmit a transmission permission signal of firmware to the first wireless communication device 100a. Even when firmware is transmitted from the first wireless communication device 100a, the determination circuit 204c does not accept the firmware to be held in the second firmware holding circuit 206. In this manner, it is possible to update plural pieces of firmware in sequence based on a set angle of departure.

When pieces of firmware of the second wireless communication device 200 conveyed via a conveyor line are updated in sequence, γ degrees of a set angle of β degrees ±γ degrees are set according to a firmware transmission time, a conveyor line speed, and a distance between the first wireless communication devices 100a and 100b and the second wireless communication device 200. With this setting, updating of the second wireless communication device 200 in motion can be performed more precisely.

Figure 7:
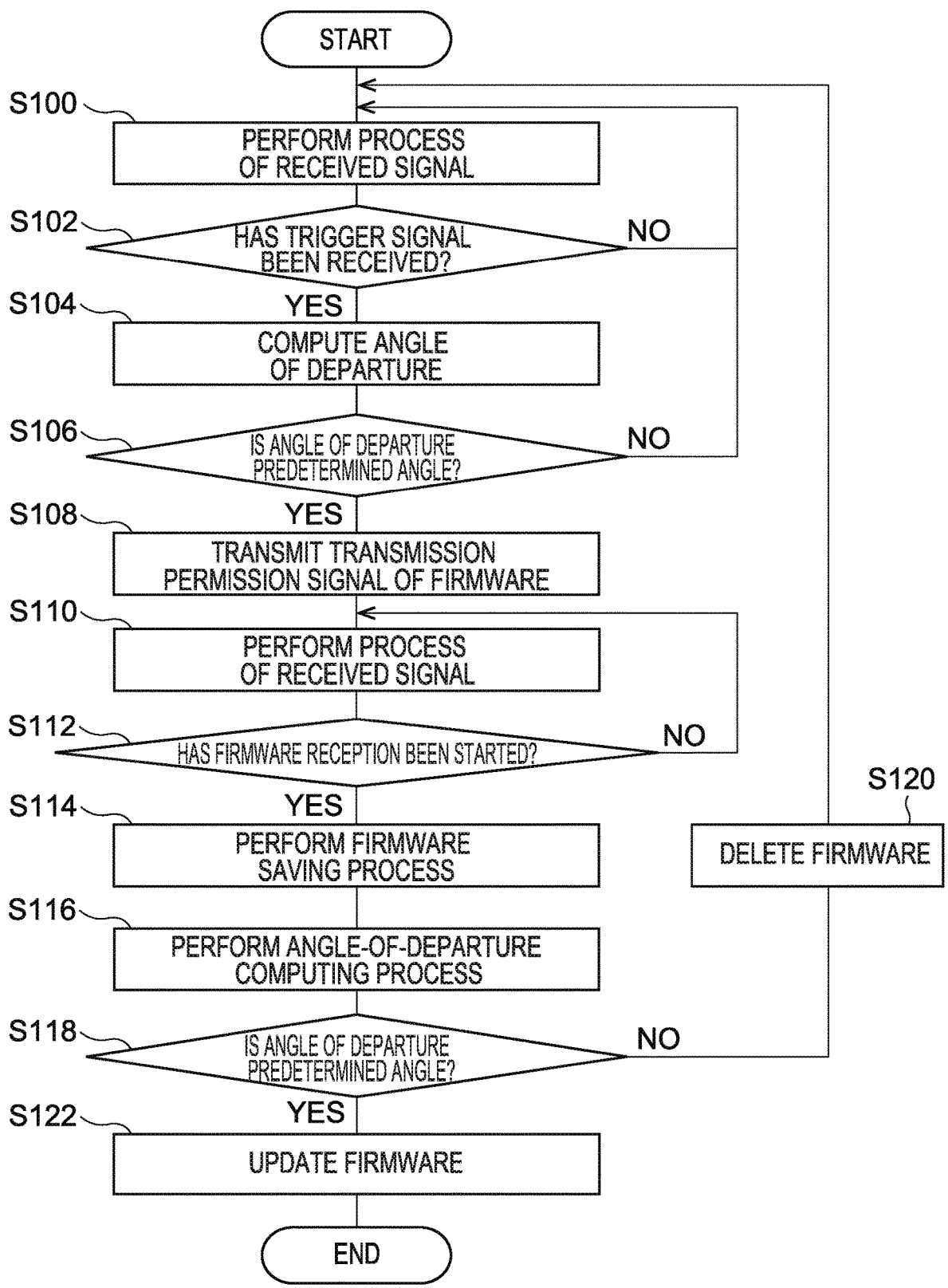
FIG. 7 is a flowchart on a side where firmware is updated.

FIG. 7 is a flowchart illustrating an example of an updating process of firmware in the second wireless communication device 200 in which updating of the firmware is performed. A case in which the determination circuit 204c performs a determining process twice is described here.

First, the second signal processing circuit 204a performs processing of a received signal (Step S100). Subsequently, the second signal processing circuit 204a determines whether a trigger signal for firmware updating has been received from the first wireless communication device 100 (Step S102). When the second signal processing circuit 204a determines that a trigger signal has been received (YES at Step S102), the angle computation circuit 204b computes the angle of departure θ based on a received radio wave (Step S104). On the other hand, when the second signal processing circuit 204a does not determine that a trigger signal has not been received (NO at Step S104), the processes from Step S100 are repeated.

The determination circuit 204c determines whether the computed angle of departure θ is a predetermined angle set in advance (Step S106). When the angle of departure θ is determined to be a predetermined angle set in advance (YES at Step S106), the determination circuit 204c determines that the first wireless communication device 100 is a device that performs updating of intended firmware, and transmits a transmission permission signal of the firmware to the first wireless communication device 100 (Step S108).

The second signal processing circuit 204a performs processing of a received signal (Step S110). Subsequently, the second signal processing circuit 204a determines whether firmware is included in the received signal (Step S112). When it is determined that firmware is included in the received signal (YES at Step S112), the second signal processing circuit 204a issues an instruction for starting holding of the firmware to the second firmware holding circuit 206, and the second firmware holding circuit 206 holds the firmware (Step S114). On the other hand, when it is determined that firmware is not included in the received signal (NO at Step S112), the processes from Step S110 are repeated.

When a firmware saving process of the second firmware holding circuit 206 is ended, the angle computation circuit 204b recomputes the angle of departure θ based on a received radio wave (Step S116).

The determination circuit 204c determines whether the recomputed angle of departure θ is a predetermined angle set in advance (Step S118). When it is determined that the angle of departure θ is a predetermined angle set in advance (YES at Step S118), the firmware processing circuit 204d updates the firmware in the second storage circuit 202 to be the firmware held in the second firmware holding circuit 206 (Step S122), and the entire processing is ended. On the other hand, when it is determined that the angle of departure θ is not a predetermined angle set in advance (NO at Step S118), the determination circuit 204c performs a deleting process of firmware that is newly held in the second firmware holding circuit 206 (Step S120), and repeats the processes from Step S100.

In this manner, when the determination circuit 204c determines that the angle of departure θ is a predetermined angle set in advance, the determination circuit 204c holds the firmware in the second firmware holding circuit 206. Subsequently, when the determination circuit 204c determines that the recomputed angle of departure θ is a predetermined angle set in advance, the firmware in the second storage circuit 202 is updated to be the firmware held in the second firmware holding circuit 206.

Figure 8:
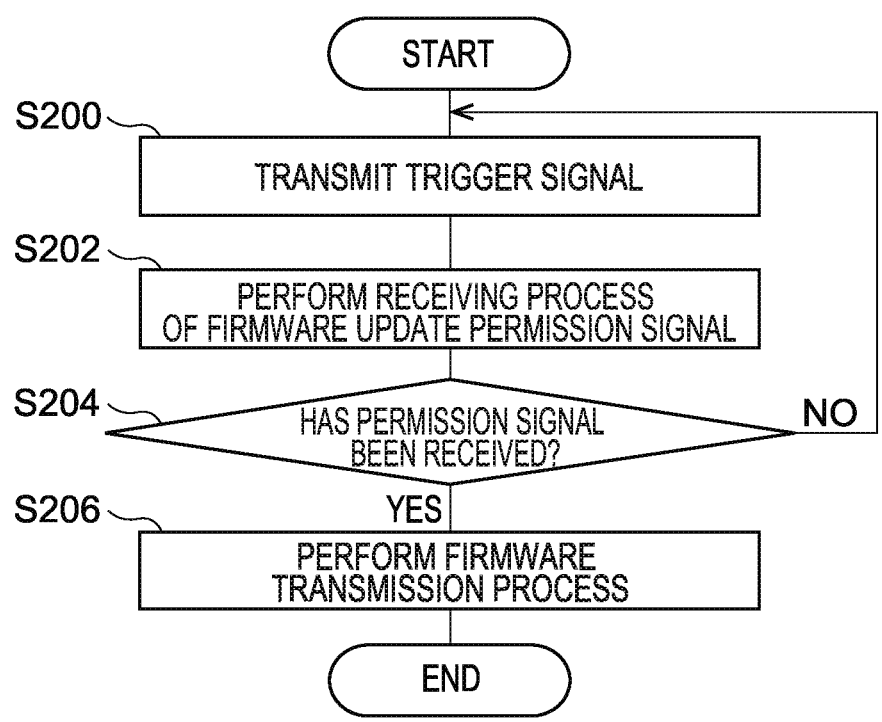
FIG. 8 is a flowchart on a side of updating firmware.

FIG. 8 is a flowchart illustrating an example of a firmware transmission process in a device on a side of updating firmware.

First, the first signal generation circuit 104a generates a trigger signal as a system signal and transmits the trigger signal (Step S200).

Next, the first signal processing circuit 104b performs processing of a signal received from the second wireless communication device 200 (Step S202). Subsequently, the first signal processing circuit 104b determines whether information of a firmware transmission permission is included in the received signal (Step S202), and when the information of a firmware transmission permission is included (YES at Step S202), the first communication circuit 108 performs transmission of the firmware in the first firmware holding circuit 106 (Step S204), and the entire processing is ended.

On the other hand, when the information of a firmware transmission permission is not included in the received signal (No at Step S202), the processes from Step S200 are repeated. In this manner, when a transmission permission signal of firmware responding to a trigger signal is received, the first communication circuit 108 performs transmission of the firmware in the first firmware holding circuit 106 (Step S206).

As described above, according to the present embodiment, it is assumed that, when the first wireless communication device 100 transmits a signal including firmware and when an angle of departure computed by the second wireless communication device 200 based on a received radio wave is a predetermined angle, updating of the firmware is performed. With this configuration, only updating of firmware transmitted from the first wireless communication device 100 with a predetermined angle of departure set in advance is performed, so that it is possible to prevent updating of firmware transmitted from an unintended device with an angle of departure that is different from a predetermined angle set in advance.

At least a part of the first wireless communication device 100 and the second wireless communication device 200 described in the above embodiment may be constituted by hardware or software. When these devices are constituted by software, it is possible to configure that a program for realizing at least a part of the functions of the first wireless communication device 100 and those of the second wireless communication device 200 is held in a recording medium such as a flexible disk or a CD-ROM and a computer is caused to read and execute the program. The recording medium is not limited to a detachable one such as a magnetic disk or an optical disk, and a stationary recording medium such as a hard disk device or a memory may be also applicable.

Further, a program for realizing at least a part of the functions of the first wireless communication device 100 and those of the second wireless communication device 200 may be distributed via a communication line (including wireless communication) such as the Internet. Furthermore, the program may be distributed via a wired line or a wireless line such as the Internet or distributed while being held in a recording medium, in a state where the program is encrypted, modulated, or compressed.

While certain embodiments of the present invention have been described above, these embodiments have been presented by way of example only, and are not intended to limit the scope of the invention. The novel embodiments described herein may be embodied in a variety of other forms, and various omissions, substitutions, and changes may be made without departing from the spirit of the invention. These embodiments and modifications thereof would fall within the scope and spirit of the invention, and would fall within the invention described in the accompanying claims and their equivalents.

The invention claimed is:

1. A wireless communication system comprising:
a first wireless communication device configured to transmit a signal related to program; and
a second wireless communication device configured to compute an angle of departure from the first wireless communication device based on a radio wave transmitted from the first wireless communication device, and to perform updating of the program when a computed angle of departure is a predetermined angle,
wherein:
the first wireless communication device comprises:
a first antenna circuit including a plurality of antennas; and
a first communication circuit configured to transmit a radio wave from each of the antennas,
the second wireless communication device comprises an angle computation circuit configured to compute the angle of departure based on a phase difference among the respective radio waves transmitted from each of the antennas,
the first wireless communication device is configured to transmit a signal including information of an interval between the antennas and a wavelength of the radio wave, and
the angle computation circuit of the second wireless communication device is configured to compute the angle of departure based on at least the phase difference from among the phase difference, the interval between the antennas, and the wavelength of the radio wave.

2. The system of claim 1, wherein:
the first wireless communication device further comprises a first signal generation circuit configured to generate a trigger signal,
the first communication circuit is configured to transmit the trigger signal,
the second wireless communication device further comprises a second signal processing circuit configured to determine that the trigger signal has been received, and
the angle computation circuit is configured to start computation of the angle of departure according to a determination result of the second signal processing circuit.

3. The system of claim 1, wherein:
after receiving the program from the first wireless communication device, the angle computation circuit is configured to recompute the angle of departure based on a phase difference among the radio waves transmitted from the antennas, and
the second wireless communication device further comprises a program processing circuit configured to perform updating of the program when the recomputed angle of departure is a predetermined angle of departure.

4. The system of claim 1, wherein the program comprises firmware or software.

5. A wireless communication system comprising:
a first wireless communication device configured to transmit a signal related to program; and
a second wireless communication device configured to compute an angle of departure from the first wireless communication device based on a radio wave transmitted from the first wireless communication device, and to perform updating of the program when a computed angle of departure is a predetermined angle,
wherein:
the first wireless communication device comprises:
a first antenna circuit including a plurality of antennas; and
a first communication circuit configured to transmit a radio wave from each of the antennas,
the second wireless communication device comprises an angle computation circuit configured to compute the angle of departure based on a phase difference among the respective radio waves transmitted from each of the antennas, the second wireless communication device further comprises a program holding circuit, when the computed angle of departure is a predetermined angle, the second wireless communication device holds program in the program holding circuit, and when the computed angle of departure is a predetermined angle, the second wireless communication device is configured to transmit a transmission permission signal of the program to the first wireless communication device.

6. A wireless communication device comprising:

an antenna circuit configured to receive a radio wave signal including a trigger signal;

a signal processing circuit configured to determine that a trigger signal has been received;

a program holding circuit configured to hold program;

an angle computation circuit configured to compute an angle of departure from a transmission source based on a phase difference among a plurality of received radio waves when the signal processing circuit has received the trigger signal; and a program processing circuit configured to perform updating of the program based on reception information from a transmission source when the computed angle of departure is a predetermined angle of departure.

* * * * *